(12) United States Patent
Smith

(10) Patent No.: US 6,866,405 B2
(45) Date of Patent: Mar. 15, 2005

(54) VARIABLE INTENSITY ILLUMINATOR LENS

(75) Inventor: Mark A. Smith, Holdrege, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 85 days.

(21) Appl. No.: 10/359,756

(22) Filed: Feb. 6, 2003

(65) Prior Publication Data

US 2004/0156201 A1 Aug. 12, 2004

(51) Int. Cl.⁷ .................................................. F21V 5/02
(52) U.S. Cl. ...................... 362/340; 362/225; 362/235; 362/268; 362/311; 362/332; 362/336; 362/800; 235/462.35
(58) Field of Search .............................. 362/340, 225, 362/235, 268, 311, 332, 335, 336, 800; 359/670, 709, 710, 721, 798; 235/462.35, 454, 462.42

(56) References Cited

U.S. PATENT DOCUMENTS

| | | | |
|---|---|---|---|
| 1,258,006 A | * | 3/1918 | Hess ........................ 362/336 |
| 1,977,689 A | * | 10/1934 | Muller .................. 340/815.76 |
| 4,025,761 A | * | 5/1977 | Hayosh et al. ......... 235/462.39 |
| 4,862,330 A | * | 8/1989 | Machida et al. ............. 362/522 |
| 5,055,976 A | * | 10/1991 | Arai .............................. 362/17 |
| 5,260,831 A | | 11/1993 | Suzuki et al. |
| 5,420,722 A | | 5/1995 | Bielak |
| 5,772,306 A | | 6/1998 | Okuchi |
| 6,320,182 B1 | | 11/2001 | Hubble, III et al. |

FOREIGN PATENT DOCUMENTS

| | | | |
|---|---|---|---|
| EP | 1193640 A2 | 4/2002 | |
| GB | 2225659 A | 6/1990 | |
| JP | 401280720 A | * 11/1989 | ........... G02B/27/00 |

OTHER PUBLICATIONS

European Search Report, E. Quertemont, Mar. 29, 2004, Application No. EP 04 25 0205, 2 pages.

* cited by examiner

Primary Examiner—Stephen Husar
Assistant Examiner—Sharon Payne

(57) ABSTRACT

A variable intensity illuminator lens may comprise a generally elongate transparent body having a first converging power at a first position on the generally elongate transparent body and a second converging power at a second position on the generally elongate transparent body, the first converging power at the first position on the generally elongate transparent body being different than the second converging power at the second position on the generally elongate transparent body.

18 Claims, 5 Drawing Sheets

VARIABLE INTENSITY ILLUMINATOR LENS

FIELD OF INVENTION

This invention relates to illumination systems in general and more specifically to a variable intensity illuminator lens for illumination systems.

BACKGROUND

Various types of illumination systems for illuminating objects are well-known in the art and may be used in a wide range of applications. One specific type of illumination system relates to systems for illuminating elongate objects having large length-to-width (i.e., aspect) ratios. Examples of such large aspect ratio objects include certain types of bar-code labels or other elongate labels having machine-readable indicia provided thereon. While devices for illuminating and reading data from such machine-readable (e.g., bar code) labels are known and are being used, certain types of bar code reading systems may encounter problems if the length of the bar code label exceeds the design limit length of the bar code reader. For example, portions of the machine-readable label that are located near or outside the design limit length of the reader may be improperly or insufficiently illuminated by the illumination system associated with the reader. This can make it difficult for the reader to reliably detect the machine-readable information located in the improperly- or insufficiently-illuminated areas.

The illumination problem may be better illustrated by example. Consider the situation illustrated in FIG. 1 involving an illuminated object O having a length L, the image of which is focused onto the surface of a detector D by a lens S. In order for the detector D to capture the desired detail of the object O along its entire length L, all portions of the illuminated object along its length L should equally illuminate the detector D, or at least illuminate the detector D within an allowable detection range. Unfortunately, however, the illumination, i.e., the density of luminous flux, on the surface of detector D varies inversely with the square of the distance from the illuminated object O (a luminous source) and directly with the cosine of the angle θ between the luminous flux and the normal N to the surface of detector D. Therefore, the illumination on the surface of the detector D decreases toward each end of the object O, and some means for compensating for this reduction in illumination must be found if the detector D is to have the same effective sensitivity for points near each end of the illuminated object O as it does for points near the center of the object O.

The illumination problems described above tend to be even more severe if the light source used to illuminate the object does not uniformly illuminate the object along its length. For example, if the object is illuminated with light from a single lamp, the illumination provided to the object will also decrease in the manner described above, i.e., with the square of the distance between the light source and the object and directly with the cosine of the angle between the lamp and the normal to the surface of the object. Accordingly, the illumination loss at the detector when detecting objects having relatively large aspect ratios (i.e., ratios of length-to-width) is due to two factors: 1) the increased distance that such "off-center" points are located from the detector; and 2) the fact that such off-center points receive less illumination from the light source.

SUMMARY OF THE INVENTION

One embodiment of a variable intensity illuminator lens comprises a generally elongate transparent body having a first converging power at a first position on the generally elongate transparent body and a second converging power at a second position on the generally elongate transparent body, the first converging power at the first position on the generally elongate transparent body being different than the second converging power at the second position on the generally elongate transparent body.

BRIEF DESCRIPTION OF THE DRAWING

Illustrative and presently preferred embodiments of the invention are shown in the accompanying drawing in which.

DETAILED DESCRIPTION

Figure 1:
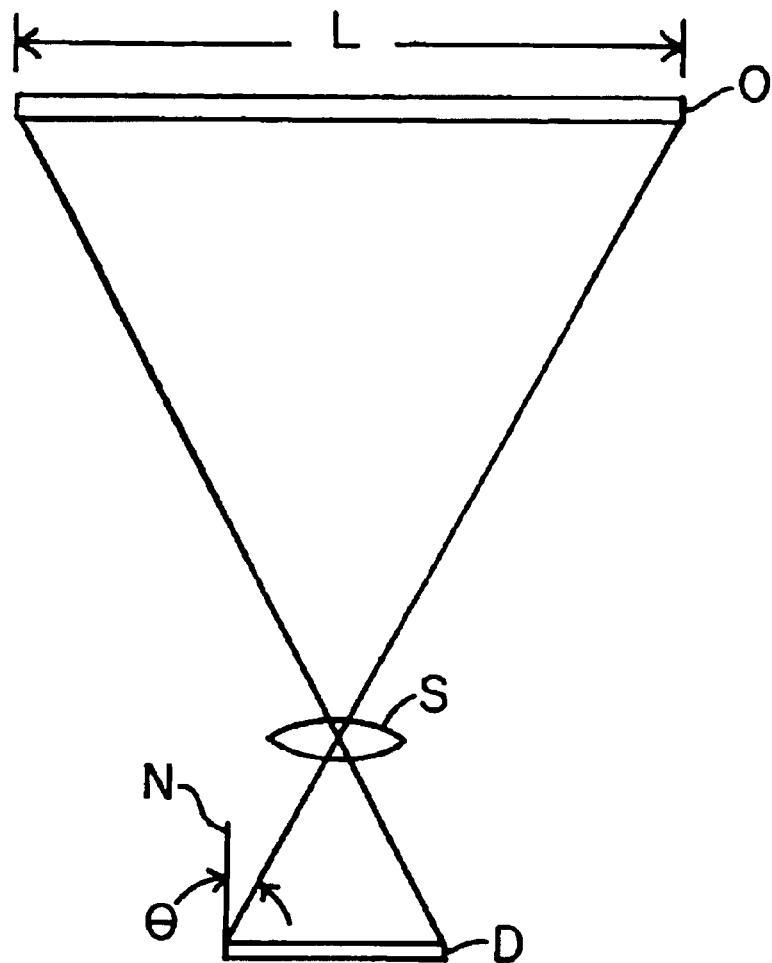
FIG. 1 is a simplified schematic view of an optical system for focusing the image of an illuminated object onto a detector array.
Figure 2:
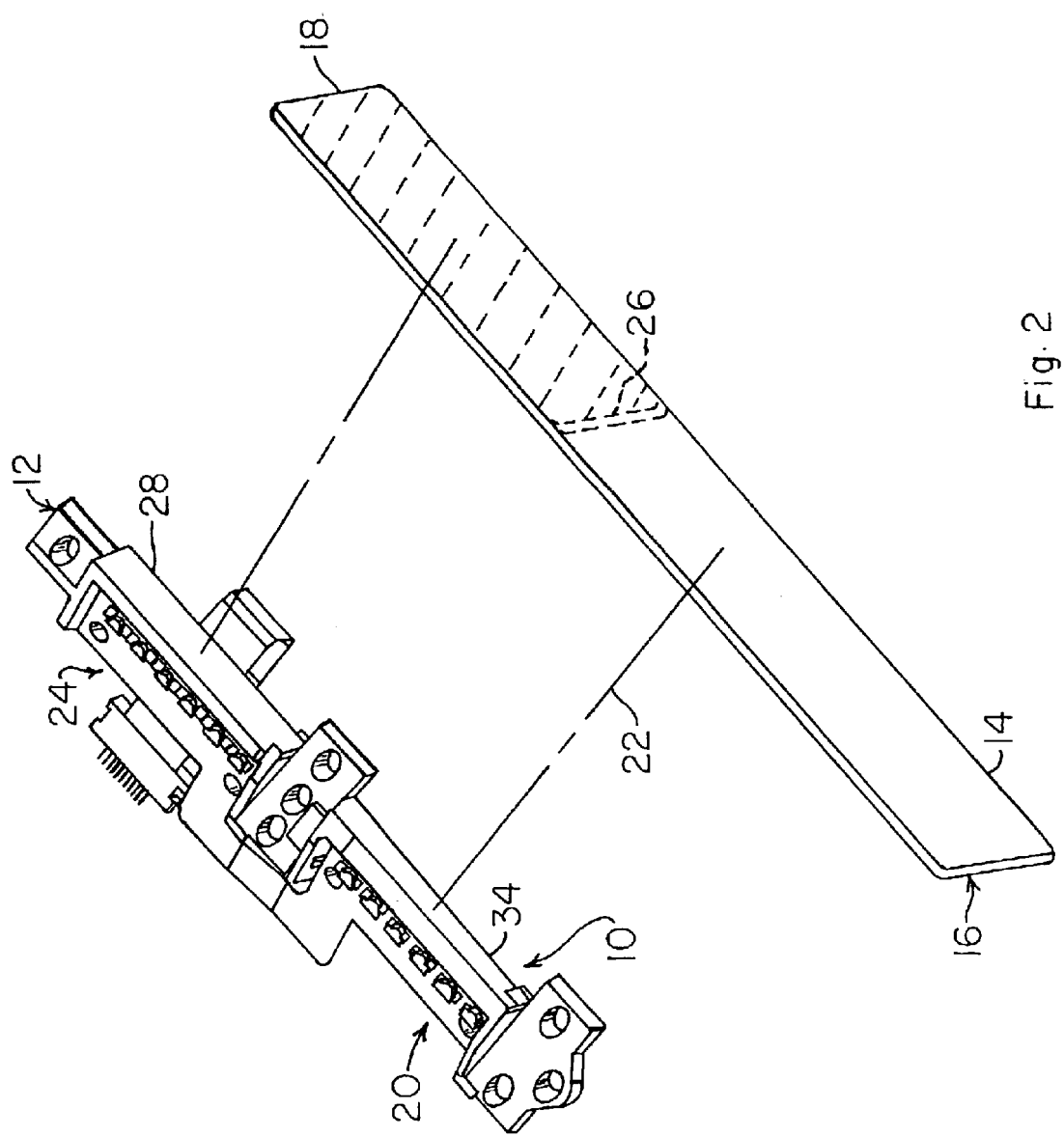
FIG. 2 is a perspective view of an embodiment of a variable intensity illuminator lens of the present invention shown as it could comprise a part of an illumination system for illuminating a high aspect-ratio object.

A variable intensity illuminator lens 10 according to one embodiment of the present invention is shown in FIG. 2 and described herein as it may be used in an illumination system 12 to provide for improved illumination of an end portion 14 of a high aspect-ratio object 16, such as an elongate label 18 having machine-readable indicia (not shown) provided thereon. See FIG. 2. Alternatively, and as will be described in greater detail below, the variable intensity illuminator lens 10 may be used in any of a wide range of other applications wherein it is desired or required to provide a variable intensity illumination to an object, either for its own sake or to help compensate for illumination reductions associated with off-axis points on the object in a manner to be described.

As its name implies, the variable intensity illuminator lens 10 may be designed or configured to provide a variable intensity illumination pattern which may be used to advantage in any of a wide range of applications. For example, in the application shown and described herein, the variable intensity illumination pattern provided by the variable intensity illuminator lens 10 helps to compensate for the illumination reduction normally experienced by points on the object 16 that are located a significant distance away from the optical axis 22 of the variable intensity illuminator lens 10. Such points are referred to herein as "off-axis" points. Of course, other applications are possible, as would be obvious to persons having ordinary skill in the art after having become familiar with the teachings of the present invention. For example, in another application the variable intensity illuminator lens 10 according to the present invention may be used to provide a variable intensity illumination pattern on the object, rather than to compensate for any uneven illumination.

Figure 3:
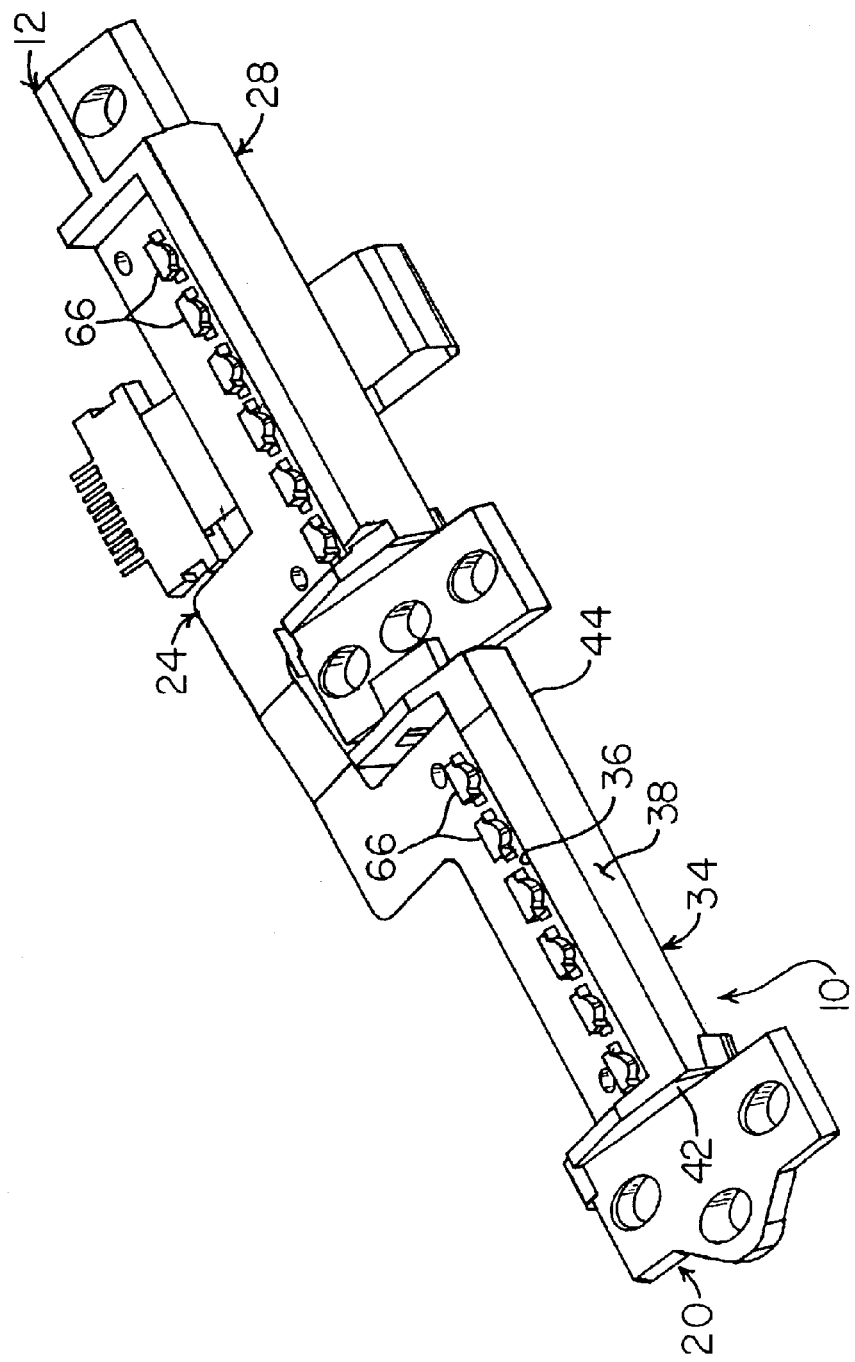
FIG. 3 is an enlarged perspective view of the illumination system shown in FIG. 2.
Figure 4:
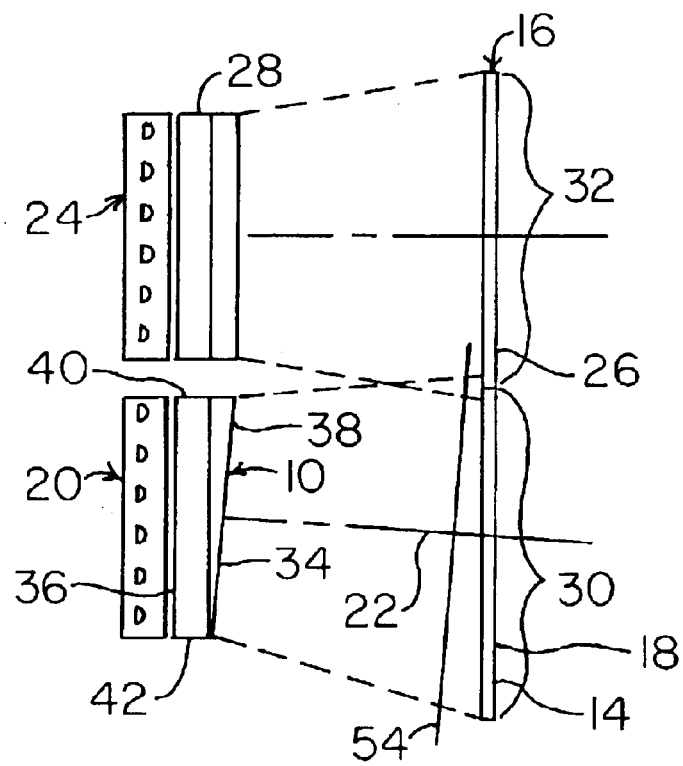
FIG. 4 is a plan view of the illumination system shown in FIGS. 2 and 3.

With reference now to FIGS. 2–4, one embodiment 10 of a variable intensity illuminator lens 10 is best seen in FIGS. 2–4 as it could be used in an illumination system 12 associated with a bar-code reader device (not shown). In the embodiment shown and described herein, the bar-code reader device is configured to read both a low aspect-ratio label (illustrated by broken lines 26) as well as the elongate or high aspect-ratio label 18. In order to enhance the ability of the bar-code reader device to read both low and high aspect-ratio labels (e.g., 26 and 18), the illumination system 12 comprises both the variable intensity illuminator lens 10 as well as a conventional cylindrical lens assembly 28. It should be noted, however, that the variable intensity lens 10 need not be used in conjunction with a conventional cylindrical lens assembly, but could instead be used alone to provide the desired illumination. Consequently, the present invention should not be regarded as limited to the particular arrangements shown and described herein.

Continuing now with the description of one embodiment of the invention, the variable intensity lens assembly 10 is positioned adjacent a first light source 20, whereas the cylindrical lens assembly 28 is positioned adjacent a second light source assembly 24. The two lens and light source assemblies may be positioned in side-by-side adjacent relationship in the manner best seen in FIGS. 2–4, although other arrangements are possible. The variable intensity illuminator lens 10 directs light from the light source 20 to the remote target region 30 on the label 18 comprising the object 16. The cylindrical lens assembly 28 directs light from the light source 24 to the proximate target region 32 on the object 16, as is best seen in FIG. 4. Accordingly, in this embodiment, the proximate target region 32 coincides with the normal detection position of the low aspect-ratio label 26, whereas the remote target region 30 coincides with the normal detection position of the end portion 14 of the elongate or high aspect-ratio label 18.

The foregoing arrangement enables the bar-code reader device (not shown) associated with the illumination system 12 to detect both a low aspect-ratio label 26 and an elongate or high aspect-ratio label 18. The low aspect-ratio label 26 is illuminated primarily by the cylindrical lens 28 and second light source 24, whereas the elongate or high aspect-ratio label 18 is illuminated both by the cylindrical lens 28 and second light source 24 as well as the variable intensity illuminator lens 10 and first light source 20.

The light sources 20 and 24 used to produce the light required to illuminate the object 16 may comprise any of a wide variety of light sources that are now known in the art or that may be developed in the future that are or would be suitable for the intended application. Consequently, the present invention should not be regarded as limited to use with any particular type of light source. However, by way of example, in one preferred embodiment, both light sources 20 and 24 comprise linear arrays of light emitting diodes (LEDs) of the type that are readily commercially available. More specifically, each light source 20 and 24 comprises an array of six individual LEDs 66 arranged in the manner best seen in FIG. 3. Alternatively, a greater or lesser number of LEDs may be used depending on the requirements of the particular application. In addition, since light sources, such as light sources 20 and 24, for providing the light required to illuminate the object 16 are well-known in the art and could be easily provided by persons having ordinary skill in the art after having become familiar with the teachings of the present invention, the particular light sources 20 and 24 that may be utilized in conjunction with the present invention will not be described in further detail herein.

Figure 5:
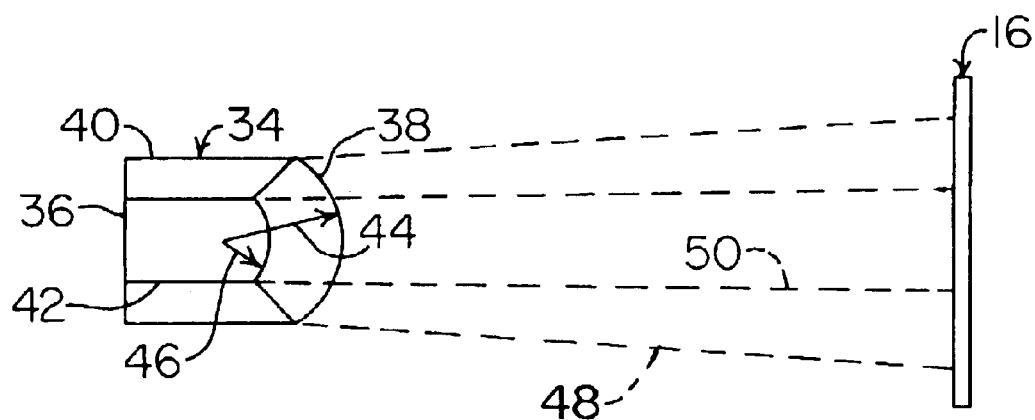
FIG. 5 is a side view in elevation of the variable intensity illuminator lens according to one embodiment of the present invention.

Referring now to FIGS. 3–5, the variable intensity illuminator lens 10 according to one embodiment of the invention may comprise a generally elongate transparent body 34 having a light input surface 36, a light output surface 38, a proximal end 40 and a distal end 42. The variable intensity illuminator lens 10 is positioned adjacent the light source assembly 20 so that the light input surface 36 receives light from the light source assembly 20.

With reference now primarily to FIG. 4, the variable intensity illuminator lens 10 is provided with a variable converging power along its length. In one embodiment, the variable intensity illuminator lens 10 is configured to have a first converging power at the proximal end 40 and a second converging power at the distal end 42. In the embodiment shown and described herein, the second converging power at the distal end 42 of the variable intensity illuminator lens 10 is greater than the first converging power at the distal end 40. This arrangement enables the variable intensity illuminator lens 10 to provide a more narrowly collimated beam portion 50 near the distal end 42 compared to the collimated beam portion 48 produced near the proximal end 40 of the variable intensity illuminator lens 10. See FIG. 5.

The different converging powers of the variable intensity illuminator lens 10 may be achieved in a variety of ways. For example, in the embodiment shown and described herein the light output surface 38 of lens 10 is curved, having a generally semi-circular cross-section, while the light input surface 36 is substantially planar. See FIG. 5. However, the cross-section of the variable intensity illuminator lens 10 is not uniform along the length of the lens 10. That is, in the embodiment shown and described herein, the radius of curvature 44 of the curved light output surface 38 at the proximal end 40 is greater than the radius of curvature 46 at the distal end 42. These different curvature radii 44 and 46 provide the variable intensity lens 10 with different converging powers along the length of the lens 10.

The different converging powers along the length of the variable intensity illuminator lens 10 enable the lens 10 to provide a variable intensity output beam. In one embodiment, the different converging powers enable the lens 10 to compensate, or at least to partially compensate, for the normal illumination losses that occur when illuminating off-axis points on the object 16, i.e., those points (such as points located near and around the end 14 of label 18) that are displaced by a significant distance from the optical axis 22 of the variable intensity lens 10.

For example, and with reference now to FIG. 5, the radius of curvature 44 at the proximal end 40 of variable intensity illuminator lens 10 forms a first beam portion 48, whereas the radius of curvature 46 at the distal end 42 of the variable intensity illuminator lens 10 forms a second beam portion 50. Because, in the embodiment shown and described herein, the radius of curvature 44 at the proximal end 40 is greater than the radius of curvature 46 at the distal end 42, the second beam portion 50 is more narrowly collimated than is the first beam portion 48. Accordingly, the more narrowly collimated second beam portion 50 has a higher intensity than the less narrowly collimated first beam portion 48 for points located a given distance from the lens 10 and from the optical axis 22. This is the situation illustrated in FIG. 6. That is, FIG. 6 is a schematic representation of a light "footprint" 52 produced by the variable intensity illuminator lens 10 on a plane 54 that is orthogonal to the optical axis 22 of the variable intensity illuminator lens 10 (FIG. 4).

Figure 6:
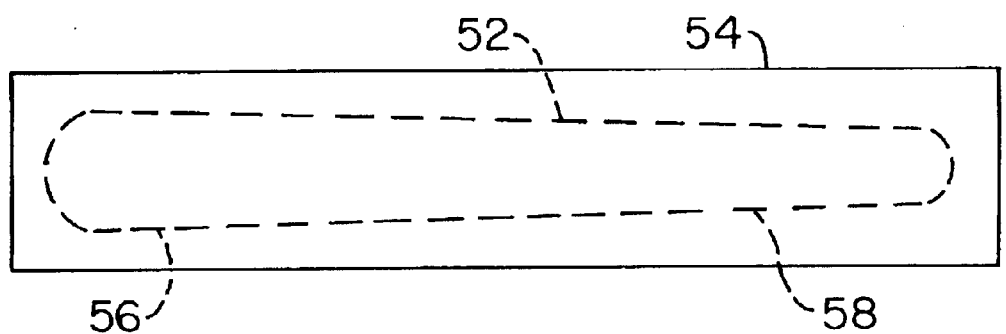
FIG. 6 is a schematic representation of an illumination footprint produced by an embodiment of a variable intensity illuminator lens on a plane orthogonal to the optic axis of the variable intensity illuminator lens.

As is best seen in FIG. 6, the left-hand portion or first end 56 of the footprint 52 is produced by the first beam portion 48, whereas the right-hand portion or second end 58 of the footprint 52 is produced by the second beam portion 50. Since the second beam portion 50 is more narrowly collimated than is the first beam portion 48, the illumination (i.e., density of luminous flux) at the second end 58 of footprint 52 is greater than the illumination provided to the first end 56 of the footprint 52.

Figure 7:
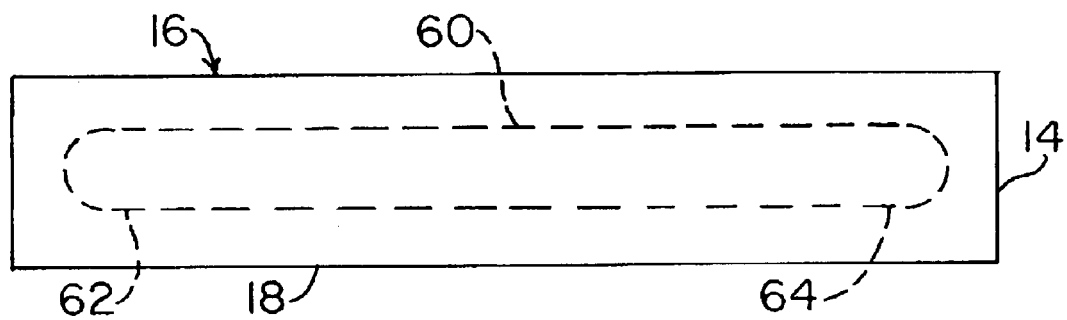
FIG. 7 is a schematic representation of an illumination footprint produced by an embodiment of a variable intensity illuminator lens on the object.

The illumination footprint will be different from the one shown in FIG. 6 if the object to be illuminated is not orthogonal to the optical axis 22 of the variable intensity illuminator lens 10. For example, and with reference now to FIGS. 4 and 7, the object 16 (e.g., label 18) of one preferred embodiment is not orthogonal to the optical axis 22 of the lens 10. See FIG. 4. Accordingly, the end portion 14 of the label 18 comprising object 16 will receive less illumination than the corresponding points on the plane 54 that is orthogonal to the optical axis 22 of lens 10 and somewhat closer to the lens 10. This is due to at least two factors: First, the cosine of the angle between a normal to the object 16 and the incoming luminous flux is smaller for points near the far end 14 of the object 16. Second, points near the far end 14 of the object 16 are located a greater distance from the light source 20. In this situation, the illumination footprint 60 on the object 16 will be more uniform, having first and second ends 62 and 64 that receive substantially the same illumination than would otherwise be the case if the lens comprised a simple cylindrical lens, such as lens 28.

Of course, the amount of converging power provided by the variable intensity illuminator lens 10 will depend on the particular application in which it is to be used, as would be obvious to persons having ordinary skill in the art after having become familiar with the teachings of the present invention. Consequently, the present invention should not be regarded as limited to any particular variation. However, by way of example, in one preferred embodiment, the converging power associated with the distal end 42 of lens 10 is greater than the converging power associated with the proximal end 40 in the manner already described. Moreover, the converging power varies in continuously and in a linear manner along the length of the lens 10. Accordingly, the light output surface 38 of lens 10 comprises a section of a truncated cone.

However, other shapes and/or curvatures of the variable intensity illuminator lens 10 are possible. For example, the cross-section of the light output surface 38 need not comprise a semi-circular section, but could instead comprise an elliptical section, or some combination of elliptical and semi-circular sections. Still other configurations may not utilize curved surfaces at all, but could instead comprise a plurality of plane surfaces positioned at different angles with respect to one another in order to provide the desired degree of convergence.

Moreover, the converging power of the lens 10 need not vary in a linear manner from the proximal end 40 to the distal end 42, but instead could be made to vary in a non-linear manner from the proximal end 40 to the distal end 42. In still another configuration, the greatest converging power of the lens 10 need not be provided at either the proximal end 40 or the distal end 42 but instead could be provided anywhere along the length of the lens 10. Accordingly, since the variable intensity illuminator lens 10 may be provided with any of a wide range of shapes and configurations in order to provide an illumination footprint having a given illumination variation, the present invention should not be regarded as limited to a variable intensity illuminator lens having the shapes and configurations shown and described herein.

While it is possible to derive by manual analytical methods the various shapes and configurations for the variable intensity illuminator lens 10 that would be required to produce an illumination footprint having the desired illumination variation to achieve a workable design in any particular application, it is generally preferable to utilize any of a wide range of computer programs that are now known in the art or that may be developed in the future to assist in developing the particular lens shapes and configurations that will provide the desired illumination pattern. For example, in the embodiment shown and described herein, the curvature provided to the light output surface 38 at each end 40, 42 of the lens 10 were derived using manual methods to provide the desired degree of convergence. The curvature of the light output surface 38 at points intermediate the proximal and distal ends 40 and 42 were then made to vary linearly along the length of the lens 10. Stated another way, the radius of curvature of the light output surface 38 of lens 10 decreases linearly from the first curvature radius 44 at the proximal end 40 to the second curvature radius 46 at the distal end 42 of lens 10. However, since any of a wide range of analytical methods and/or computer programs that would be suitable for assisting in the design of the variable intensity illuminator lens are well-known in the art and could be easily used by persons having ordinary skill in the art to design a variable intensity illuminator lens according to the teachings of the present invention, the particular methods used on one preferred embodiment will not be described in further detail herein.

The variable intensity illuminator lens 10 may be manufactured from any of a wide range of transparent materials, such as plastic or glass, that would be suitable for the particular application. Consequently, the present invention should not be regarded as limited to a variable intensity illuminator lens 10 made from any particular material. However, by way of example, in one preferred embodiment, the variable intensity illuminator lens 10 is molded from a transparent polycarbonate thermoplastic material. Molding the variable intensity lens 10 from a transparent thermoplastic material allows the shape, thus converging power, of the variable intensity illuminator lens 10 to conform to any of a wide variety of configurations in order to provide any of a wide range of variable intensity illumination patterns.

The variable intensity illuminator lens 10 according to the present invention may be used to provide for improved illumination of a high aspect-ratio object 16, such as the elongate label 18 having the far end 14, that is to be detected by a bar code reader device (not shown) operatively associated with the illuminator lens 10. Assuming that both light sources 20 and 24 have been activated, light from the light source 20 is directed toward the elongate label 18 by the variable intensity illuminator lens 10. Similarly, light from the light source 24 is directed toward the elongate label 18 by the conventional cylindrical lens 28. The combination of the two light sources (e.g., 20 and 24) as well as the lens assemblies (e.g., the variable intensity illuminator lens 10 and the cylindrical lens 28) illuminate substantially the entirety of the elongate label 18. As is best seen in FIG. 4, the variable intensity illuminator lens 10 provides for improved illumination of the far end 14 of the elongate label 18 by increasing the intensity of the illumination toward the distal end 42 of the lens 10. The increased illumination intensity is a result of the increased converging power of the variable intensity illuminator lens 10 at the distal end 42. Accordingly, the object illumination footprint 60 (FIG. 7) on the label 18 that is produced by the variable intensity illuminator lens 10 is considerably more uniform than it otherwise would be if a conventional cylindrical lens were used. The improved illumination of the far end 14 of the label 18 substantially improves the ability of the detector (not shown) of the bar-code reading device (also not shown) to reliably detect the far end 14 of the label 18.

An advantage of the variable intensity illuminator lens according to the present invention is that the variable intensity illuminator lens 10 provides for improved uniformity of illumination of the remote target region 30 (i.e., end portion 14 of elongate label 18). The improved illumination enables the bar-code reading device (not shown) operatively associated with the illumination system 12 to reliably read both high and low aspect-ratio labels, i.e., labels contained in both the remote and the proximate target regions 30 and 32, respectively. Another advantage of the present invention is that the variable intensity illuminator lens 10 may be used to illuminate an object that is considerably longer than the lens 10, thereby allowing for a more compact illumination system than otherwise would be possible. Yet another advantage of the variable intensity illuminator lens 10 is that it may be configured to provide any of a wide range of illumination variations, thereby allowing the lens 10 to be used advantageously in any of a wide variety of illumination systems.

It is contemplated that the inventive concepts herein described may be variously otherwise embodied and it is intended that the appended claims be construed to include alternative embodiments of the invention except insofar as limited by the prior art.

What is claimed is:

1. An illumination system, comprising:
   a variable intensity illuminator lens comprising a generally elongate transparent body, said generally elongate transparent body having a light input surface and a light output surface, said variable intensity illuminator lens having a first converging power at a first position on said generally elongate transparent body and a second converging power at a second position on said generally elongate transparent body, the first converging power being different from the second converging power;
   a first light source positioned adjacent the light input surface of said variable intensity illuminator lens;
   a cylindrical lens positioned adjacent said variable intensity illuminator lens so that said cylindrical lens and said variable intensity illuminator lens extend along a lengthwise direction; and
   a second light source positioned adjacent said cylindrical lens, said variable intensity illuminator lens directing light from said first light source to a remote target region on an object, said cylindrical lens directing light from said second light source to a proximate target region on the object.
2. The illumination system of claim 1, wherein said light input surface is planar.
3. The illumination system of claim 1, wherein said light output surface comprises a semi-circular cross-section having a first radius at the first position on said generally elongate transparent body and wherein said light output surface comprises a semi-circular cross-section having a second radius at the second position on said generally elongate transparent body.
4. The illumination system of claim 1, wherein said light output surface comprises a truncated conic surface.
5. The illumination system of claim 1, wherein said light output surface comprises a semi-elliptical cross-section at the first position on said generally elongate transparent body and wherein said light output surface comprises a semi-elliptical cross-section at the second position on said generally elongate transparent body.
6. The illumination system of claim 1, wherein said transparent body comprises glass.
7. The illumination system of claim 1, wherein said transparent body comprises plastic.
8. A variable intensity illuminator lens comprising a generally elongate transparent body extending along a length, said generally elongate transparent body having a light input surface and a light output surface, the light output surface having a first non-semi-circular cross-section at a first position along the length of said generally elongate transparent body and a second non-semi-circular cross-section at a second position along the length of said generally elongate transparent body, the first non-semi-circular cross-section at the first position along the length of said generally elongate transparent body being different than the second non-semi-circular cross-section at the second position along the length of said generally elongate transparent body.
9. The lens of claim 8, wherein the first non-semi-circular cross-section of said light output surface comprises a first semi-elliptical cross-section and wherein the second non-semi-circular cross-section of said light output surface comprises a second semi-elliptical cross-section.
10. The lens of claim 8, wherein wherein the light output surface comprises a plurality of plane surfaces that extend along the length of said generally elongate transparent body so that the first non-semi-circular cross-section of said light output surface comprises a first configuration of said plane surfaces and wherein the second non-semi-circular cross-section of said light output surface comprises a second configuration of said plane surfaces.
11. A method for illuminating a high aspect-ratio object, comprising:
    directing light through a variable intensity illuminator lens and through a cylindrical lens positioned adjacent the variable intensity illuminator lens, light from the variable intensity illuminator lens illuminating a remote target region on the high aspect-ratio object, light from the cylindrical lens illuminating a proximate target region on the high aspect-ratio object.
12. The illumination system of claim 1, wherein said first light source comprises an elongate light source positioned adjacent the light input surface of said variable intensity illuminator lens and extending substantially between first and second of said variable intensity illuminator lens.
13. The illumination system of claim 12, wherein said elongate light source comprises a plurality of light emitting diodes.
14. The illumination system of claim 1, wherein said second light source comprises an elongate light source positioned adjacent said cylindrical lens and extending substantially between first and second ends of said cylindrical lens.
15. A method for selectively illuminating a high aspect-ratio object and a low aspect-ratio object, comprising:
    illuminating substantially the entirety of the high aspect-ratio object by directing light through a variable intensity illuminator lens and through a cylindrical lens positioned adjacent the variable intensity illuminator lens, light from the variable intensity illuminator lens illuminating a remote target region on the high aspect-ratio object, light from the cylindrical lens illuminating a proximate target region on the high aspect-ratio object; and illuminating the low aspect-ratio object by directing light through the cylindrical lens only, light from the cylindrical lens illuminating substantially the entirety of the low aspect-ratio object.

16. A variable intensity illuminator lens comprising a generally elongate transparent body, said generally elongate transparent body having a light input surface and a curved light output surface, the curved light output surface having a first semi-elliptical cross-section at a first position on said generally elongate transparent body and a second semi-elliptical cross-section at a second position on said generally elongate transparent body, the first semi-elliptical cross-section being different from the second semi-elliptical cross-section.

17. An optical system for illuminating an object, comprising:

a variable intensity illuminator lens comprising a generally elongate transparent body, said generally elongate transparent body having a light input surface and a curved light output surface, said curved light output surface having a first end and second end, the curved light output surface having a first semi-elliptical cross-section at the first end and a second semi-elliptical cross-section at the second end, the first semi-elliptical cross-section at the first end being different from the second semi-elliptical cross-section at the second end; and a light source positioned adjacent the light input surface of said variable intensity illuminator lens.

18. An optical system for illuminating an object, comprising:

a variable intensity illuminator lens comprising a generally elongate transparent body, said generally elongate transparent body having a light input surface and a curved light output surface, said curved light output surface having a first end and second end, the curved light output surface having a first curvature at the first end and a second curvature at the second end, the first curvature at the first end being different from the second curvature at the second end;

a light source positioned adjacent the light input surface of said variable intensity illuminator lens;

a cylindrical lens positioned adjacent said variable intensity illuminator lens so that said cylindrical lens and said variable intensity illuminator lens extend along a lengthwise direction, said cylindrical lens having a light input end and a light output end; and a second light source positioned adjacent the light input end of said cylindrical lens.

* * * * *

UNITED STATES PATENT AND TRADEMARK OFFICE
CERTIFICATE OF CORRECTION

PATENT NO. : 6,866,405 B2  Page 1 of 1
APPLICATION NO. : 10/359756
DATED : March 15, 2005
INVENTOR(S) : Mark A. Smith It is certified that error appears in the above-identified patent and that said Letters Patent is hereby corrected as shown below:

In column 8, line 27, in Claim 10, delete "wherein wherein" and insert -- wherein --, therefor.

In column 8, line 48, in Claim 12, after "second" insert -- ends --.

Signed and Sealed this

Twenty-eighth Day of July, 2009

JOHN DOLL
*Acting Director of the United States Patent and Trademark Office*